(12) United States Patent
Matsushita et al.

(10) Patent No.: US 6,639,379 B2
(45) Date of Patent: Oct. 28, 2003

(54) ELECTRIC POWER STEERING CONTROL SYSTEM AND CONTROL METHOD THEREOF

(75) Inventors: Masaki Matsushita, Tokyo (JP); Masahiro Kimata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/051,191

(22) Filed: Jan. 22, 2002

(65) Prior Publication Data

US 2003/0057913 A1 Mar. 27, 2003

(30) Foreign Application Priority Data

Sep. 4, 2001 (JP) .................................. P2001-266792

(51) Int. Cl.[7] .............................. H02P 3/18; H02P 5/28; H02P 7/36
(52) U.S. Cl. .................. 318/727; 318/138; 318/432; 318/434; 318/700; 318/727; 318/800; 180/410; 180/443; 180/444; 180/446; 701/41; 701/42; 701/43
(58) Field of Search ................. 318/138, 432, 318/434, 700, 727, 800; 180/410, 443, 444, 446; 701/41, 42, 43

(56) References Cited

U.S. PATENT DOCUMENTS

| | | | | | |
|---|---|---|---|---|---|
| 4,765,426 | A | * | 8/1988 | Shimizu ..................... | 180/79.1 |
| 6,389,342 | B1 | * | 5/2002 | Kanda ......................... | 701/41 |
| 6,407,524 | B1 | * | 6/2002 | Endo et al. ................. | 318/432 |
| 6,427,104 | B1 | * | 7/2002 | Matsushita et al. ........... | 701/41 |
| 6,427,105 | B1 | * | 7/2002 | Matsushita et al. ........... | 701/41 |
| 6,450,287 | B1 | * | 9/2002 | Kurishige et al. .......... | 180/446 |
| 6,502,024 | B2 | * | 12/2002 | Ishihara et al. ............... | 701/41 |
| 6,504,336 | B2 | * | 1/2003 | Sakamaki .................... | 318/727 |
| 6,509,711 | B1 | * | 1/2003 | Zaemba ..................... | 318/800 |
| 2001/0002631 | A1 | * | 6/2001 | Okanoue et al. ............ | 180/446 |

FOREIGN PATENT DOCUMENTS

| | | |
|---|---|---|
| JP | 61-199470 | 9/1986 |
| JP | 1-177872 | 7/1989 |

OTHER PUBLICATIONS

"Logic of AC Servo System and Design Practice", pp. 44–47 & 86–98, May 10, 1994.

"Effects and Compensation of Magnetic Saturation in Flux--Weakening Controlled Permanent Magnet Synchrounous Motor Drives", IEEE Transaction on Industry Applications, pp. 1632–1637, vol. 30, No. 6, Nov./Dec. 1994.

* cited by examiner

Primary Examiner—Robert E. Nappi
Assistant Examiner—Tyrone W Smith
(74) Attorney, Agent, or Firm—Sughrue Mion, PLLC

(57) ABSTRACT

An electric power steering control system is arranged so as to control a drive current of a brushless motor that generates a steering assist force on the basis of a steering torque acting on a steering shaft and a vehicle speed. The system comprises a d-q axis voltage command section for computing a d- and q-axis voltage command value in response to a deviation of current between a d- and q-axis current command value and a d- and q-axis detection current value, a d-q coordinate inverse transformation section for performing the d-q coordinate inverse transformation on the basis of the d- and q-axis voltage command value and an electrical angle signal, eventually thereby computing a three-phase voltage command value, a three-phase voltage command compensation section for performing compensation with respect to the three-phase voltage command value according to a computing expression for improving the efficiency of utilizing a preset voltage, thereby computing a three-phase voltage command compensation value, and a PWM output section for generating a PWM waveform for PWM drive of the brushless motor in response to the three-phase voltage command compensation value.

18 Claims, 9 Drawing Sheets

ELECTRIC POWER STEERING CONTROL SYSTEM AND CONTROL METHOD THEREOF

BACKGROUND OF THE INVENTION

1. Technical Field

The present invention relates to an electric power steering control system for an automobile and to a control method thereof, in which an assist force when manipulating a steering wheel is generated by means of a motor.

2. Background Art

As a power steering system for an automobile, an electric power steering apparatus has been developed which apparatus detects a vehicle speed and a steering torque acting on a steering shaft, drives a motor by a drive current determined in response to the detected vehicle speed and torque, adds an assist force onto the steering shaft by means of a rotational force of the motor, and then provides a driver a comfortable steering feeling.

Hitherto, in such a type of electric power steering apparatus, as a motor for adding the assist force onto the steering shaft, a DC electric motor with a brush such as a commutator motor has been mainly used. Since the motor is with a brush, however, it is possible that any trouble or abnormal state occurs in the motor itself.

Therefore, recently use of a brushless motor has been proposed instead of the DC electric motor with a brush. However, such a motor and/or a control apparatus come to be complicated and expensive. Thus, to put into practice the control suitable for the power steering apparatus, several inherent problems to be overcome remain in terms of cost or performance.

In the electric power steering apparatus using the brushless motor, at a current command section, a command current value of is determined in response to a detected vehicle speed and torque, a motor drive current is detected by a current detector, a value of a feedback current fed back to a current control section is computed, and an inverter is controlled so as to clear a deviation between said value of the feedback current and said value of current command. In this manner, the brushless motor is PWM driven.

In such a control method, each phase voltage applied to the electric motor forms generally a sine wave. In this case, however, a line output voltage for the normal PMW drive can be only in the range of an amplitude of a fundamental wave thereof being not more than $\sqrt{3}/2$ of that of a power supply voltage. Therefore, the voltage is utilized inefficiently.

In the electric power steering control system, the motor is generally driven by a vehicle-mounted battery to generate the steering assist force. A voltage of the battery is not constant, and the voltage varies depending on conditions of use of the battery.

For example, in the electric power steering control system, even in the case that a normal battery voltage of 14V is lowered to a degree of 9V, a normal operation is still required.

In the electric power steering control system in which environment of the power supply is so harsh, it is desirable that the power supply voltage is utilized at the maximum. Efficiency of utilizing the power supply voltage getting worse means that a maximum output of the motor is reduced resulting in lowering in performance of the electric power steering control system.

In the case of applying a sine-wave voltage to each phase of the brushless motor, normal PWM drive can be performed only in the range that amplitude of the fundamental wave of the line output voltage is not more than $\sqrt{3}/2$ of the power supply voltage. As a result, efficiency of utilizing the voltage gets worse. Since, in the electric power steering control system, the motor is driven by means of the battery voltage, lowering in efficiency of utilizing the power supply voltage brings about undesirable lowering in performance of the electric power steering control system.

SUMMARY OF THE INVENTION

The present invention was made to solve the above-discussed problems, and has an object of providing an electric power steering control system and a control method thereof capable of performing normally any PWM drive even in the range that an amplitude of a fundamental wave of a line output voltage is not more than that of a power supply voltage, thereby utilizing the power supply voltage at the maximum.

An electric power steering control system according to the invention arranged to control a drive current of a brushless motor that generates a steering assist force on the basis of a steering torque acting on a steering shaft and a vehicle speed, comprises:

a d-q-axis current command section for computing a d- and q-axis current command value for generating a steering assist force in response to a predetermined characteristic on the basis of the mentioned steering torque and the mentioned vehicle speed;

an electrical angle computing section for computing an electrical angle signal on the basis of a rotational position signal of the mentioned brushless motor;

a d-q coordinate transformation section for performing a d-q coordinate transformation on the basis of a detection current signal in response to a three-phase AC current to be inputted to the mentioned brushless motor and of the mentioned electrical angle signal, thereby obtaining a d- and q-axis detection current value;

a d-q axis voltage command section for computing a d- and q-axis voltage command value in response to a deviation between the mentioned d- and q-axis current command value and the mentioned d- and q-axis detection current value;

a d-q coordinate inverse transformation section for performing a d-q coordinate inverse transformation on the basis of the mentioned d- and q-axis voltage command value and the mentioned electrical angle signal thereby computing a three-phase voltage command value;

a three-phase voltage command compensation section for performing compensation with respect to the mentioned three-phase voltage command value according to a computing expression for improving efficiency of utilizing a previously set voltage, thereby computing a three-phase voltage command compensation value; and a PWM output section for generating a PWM waveform for PWM drive of the mentioned brushless motor in response to the mentioned three-phase voltage command compensation value.

As a result of such arrangement, it is possible to obtain an electric power steering control system capable of performing normally any PWM drive even in the range that an amplitude of a fundamental wave of a line output voltage is not more than that of a power supply voltage, thereby utilizing the power supply voltage at the maximum.

It is preferable that, in the mentioned three-phase voltage command compensation section, a three-phase voltage command compensation value is obtained by subtracting a predetermined voltage value from the mentioned three-phase voltage command value.

It is preferable that a value obtained by averaging a maximum value and a minimum value among the mentioned the three-phase voltage command values is used as the mentioned predetermined voltage value.

It is preferable that a minimum value of the mentioned three-phase voltage command values is used as the mentioned predetermined voltage value.

It is preferable that, in the case of using the minimum value of the mentioned three-phase voltage command values as the mentioned predetermined voltage value, compensation is performed with respect to the mentioned three-phase voltage command value in the mentioned three-phase voltage command compensation section, only when revolution of the mentioned brushless motor is not less than a predetermined value.

It is preferable that, in the mentioned three-phase voltage command compensation section, a tertiary higher-harmonic of the mentioned three-phase voltage command value is superposed on the mentioned three-phase voltage command value, thereby obtaining a three-phase voltage command compensation value.

It is preferable that, in the case of obtaining a three-phase voltage command compensation value by superposing the tertiary higher harmonic of the mentioned three-phase voltage command value on the mentioned three-phase voltage command value, compensation is performed with respect to the mentioned three-phase voltage command value in the mentioned three-phase voltage command compensation section, only when the mentioned steering torque is not less than a predetermined value.

It is preferable that, in the mentioned d-q coordinate transformation section, a following mathematical expression is used as a computing expression to perform the d-q coordinate transformation:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Id and Iq are d- and q-axis detection current values; Iu and Iv are U-phase and V-phase detection current values to be inputted to the brushless motor; and θ is an electrical angle responsive to a rotational position of the brushless motor.

It is preferable that, in the mentioned d-q coordinate inverse-transformation section, a following mathematic expression is used as a computing expression to perform the d-q coordinate inverse transformation:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$VW^* = -Vu^* - Vv^*$$

where: Vu*, Vv* and Vw* are U-phase, V-phase and W-phase voltage command values; Vd* and Vq* are d- and q-axis voltage command values; and θ is an electrical angel responsive to the rotational position of the brushless motor.

An electric power steering control method according to the invention arranged to control a drive current of a brushless motor that generates a steering assist force on the basis of a steering torque acting on a steering shaft and a vehicle speed, comprises:

a first step of computing a d- and q-axis current command value for generating a steering assist force in accordance with a predetermined characteristic on the basis of the mentioned steering torque and the mentioned vehicle speed;

a second step of performing a d-q coordinate transformation on the basis of a detection current signal in response to a three-phase AC current to be inputted to the mentioned brushless motor and an electrical angle signal in response to a rotational position of the mentioned brushless motor thereby obtaining ad- and q-axis detection current value;

a third step of computing a d- and q- axis voltage command value in response to a deviation between the mentioned d- and q-axis current command value and the mentioned d- and q- axis detection current value;

a fourth step of performing a d-q coordinate inverse transformation on the basis of the mentioned d- and q-axis voltage command value and the mentioned electrical angle signal, thereby computing a three-phase voltage command value;

a fifth step of performing compensation with respect to the mentioned three-phase voltage command value in accordance with a computing expression for improving efficiency of utilizing a previously set voltage, thereby generating a three-phase voltage command compensation value; and a sixth step of generating a PWM waveform for PWM drive of the mentioned brushless motor in response to the mentioned three-phase voltage command compensation value.

As a result of such arrangement, -it is possible to achieve an electric power steering control method capable of performing normally any PWM drive even in the range that an amplitude of a fundamental wave of a line output voltage is not more than that of a power supply voltage, thereby utilizing the power supply voltage at the maximum.

It is preferable that, in the mentioned fifth step, a three-phase voltage command compensation value is obtained by subtracting a predetermined voltage value from the mentioned three-phase voltage command.

It is preferable that a value obtained by averaging a maximum value and a minimum value among the mentioned three-phase voltage command values is used as the mentioned predetermined voltage value.

It is preferable that a minimum value of the mentioned three-phase voltage command values is used as the mentioned predetermined voltage value.

It is preferable that, in the case of using the minimum value of the mentioned three-phase voltage command values as the mentioned predetermined voltage value, compensation is performed with respect to the mentioned three-phase voltage command value in the mentioned three-phase voltage command compensation section, only when revolution of the mentioned brushless motor is not less than a predetermined value.

It is preferable that, in the mentioned fifth step, a tertiary higher-harmonic of the mentioned three-phase voltage command value is superposed on the mentioned three-phase voltage command value, thereby obtaining a three-phase voltage command compensation value.

It is preferable that, in the case of obtaining a three-phase voltage command compensation value by superposing the tertiary higher harmonic of the mentioned three-phase voltage command value on the mentioned three-phase voltage command value, compensation is performed with respect to the mentioned three-phase voltage command value in the mentioned three-phase voltage command compensation section, only when the mentioned steering torque is not less than a predetermined value.

It is preferable that, in the mentioned second step, a following mathematical expression is used as a computing expression to perform the d-q coordinate transformation:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Id and Iq are d- and q-axis detection current values; Iu and Iv are U-phase and V-phase detection current values to be inputted to the brushless motor; and θ is an electrical angle responsive to a rotational position of the brushless motor.

It is preferable that, in the mentioned fourth step, a following mathematic expression is used as a computing expression to perform the d-q coordinate inverse transformation:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$VW^* = -Vu - Vv^*$$

where: Vu*, Vv* and Vw* are U-phase, V-phase and W-phase voltage command values; Vd* and Vq* are d- and q-axis voltage command values; and θ is an electrical angel responsive to the rotational position of the brushless motor.

DESCRIPTION OF THE PREFERRED EMBODIMENTS

Figure 1:
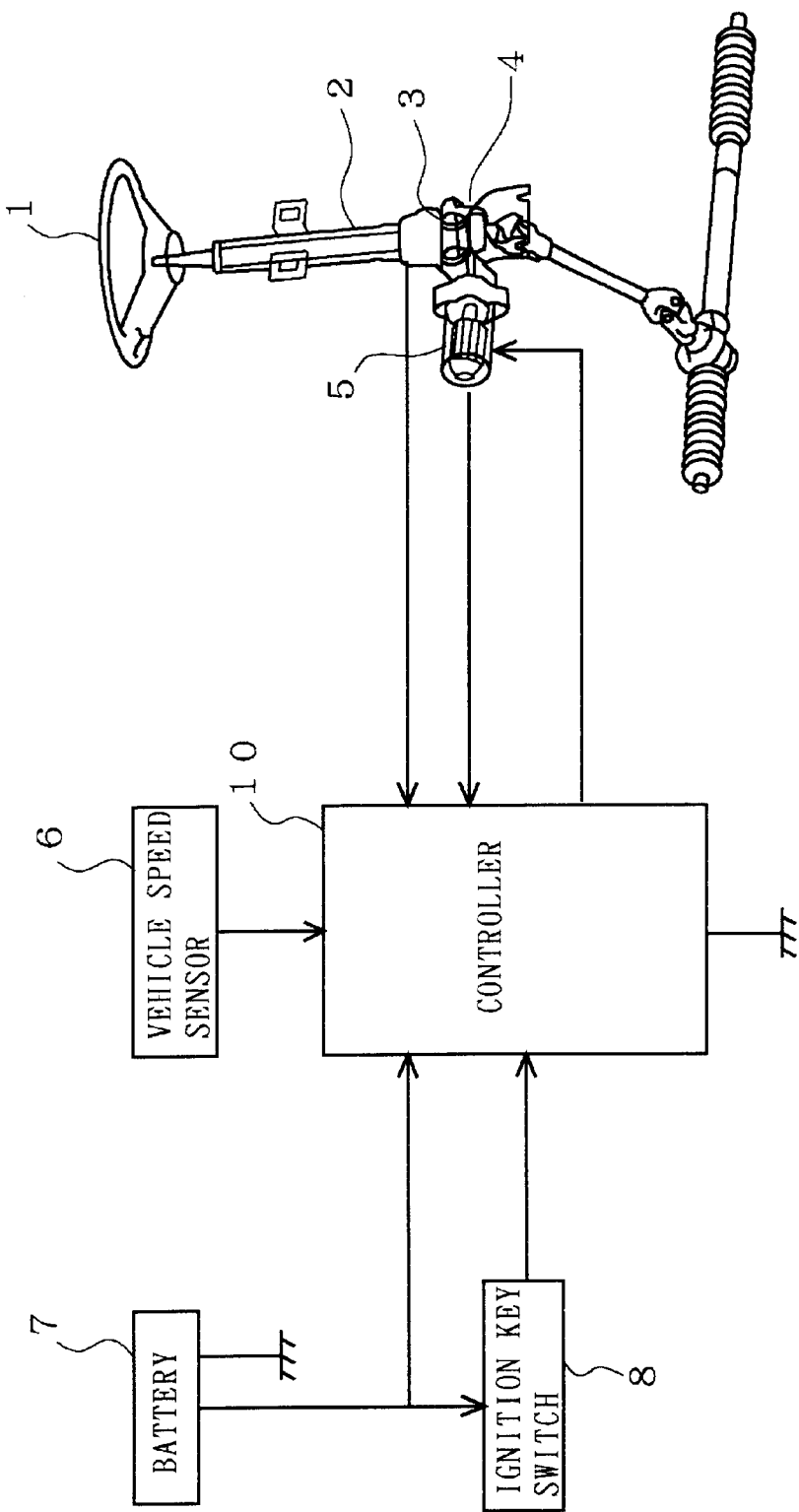
FIG. 1 is a schematic diagram showing a first preferred embodiment according to the present invention.

Embodiment 1.

An electric power steering control system according to a first preferred embodiment of the present invention is hereinafter described referring to the drawings.

FIG. 1 is a schematic diagram of the electric power steering control system according to the first embodiment. A PWM brushless motor 5, which generates a steering assist torque, is coupled to one end of a steering shaft 2 via a deceleration gear 4. A steering wheel 1 is connected to the other end of the steering shaft 2. Further, the steering shaft 2 is provided with a torque sensor 3 for detecting a steering torque of the steering wheel 1.

A controller 10 determines a steering assist torque on the basis of a steering torque value detected by the torque sensor 3 and a vehicle speed value detected by a vehicle speed sensor 6. Further, the controller 10 PWM drives the brushless motor 5 thereby assisting the steering of the steering wheel 1.

In addition, a battery 7, an ignition key switch 8 and others are connected to the controller 10.

Figure 2:
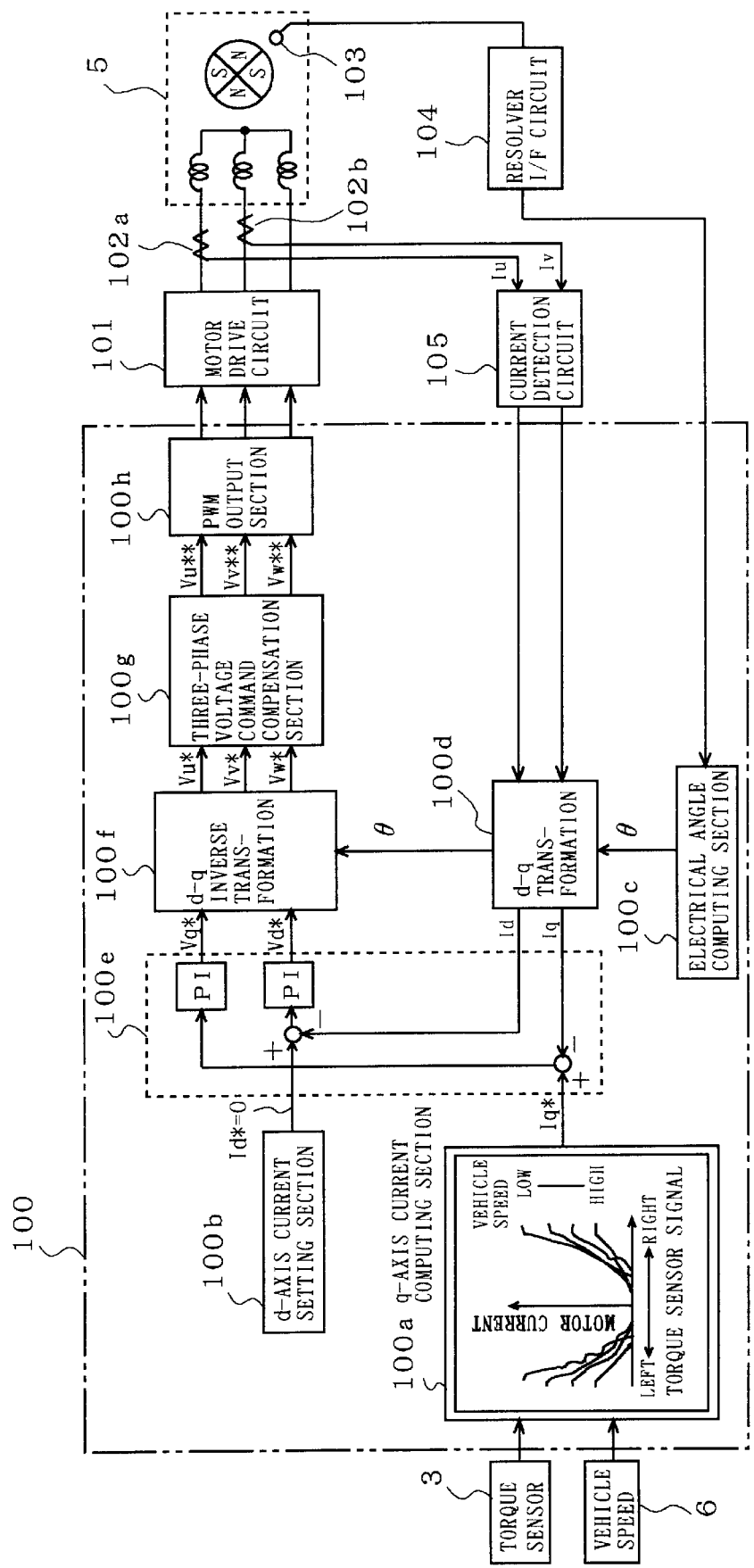
FIG. 2 is a block diagram showing an operation of the first embodiment according to the invention.

FIG. 2 a block diagram showing an operation of the electric power steering control system according to the first embodiment. A control computer 100 disposed in the controller 10 includes a q-axis current computing section 100a, a d-axis current setting section 100b, an electrical angle computing section 100c, a d-q coordinate transformation section 100d, a d-q axis voltage command section 100e, a d-q coordinate inverse transformation section 100f, a three-phase voltage command compensation section 100g, and a PMW output section 100h.

The q-axis current computing section 100a carries out computation (operation) in accordance with a predetermined characteristic on the basis of a torque detection signal from the torque sensor 3 and a vehicle-speed detection signal from the vehicle speed sensor 6. Thus, a current command value Iq* is determined for driving the brushless motor 5. Then, the section 100a feeds the determined current command value to the d-q axis voltage command section 100 e.

The d-axis current setting section 100b feeds a d-axis current command value Id*=0 (zero) to the d-q-axis voltage command section 100e.

The electrical angle computing section 100c receives, via a resolver I/F circuit 104, an input of a signal of a rotational position detected by a resolver 103 mounted onto the brushless motor 5. Further, the section 100c computes an electrical angle on the basis of the signal of the rotational position and feeds the computed electrical angle signal θ to the d-q coordinate transformation section 100d and the d-q coordinate inverse transformation section 100f.

The d-q coordinate transformation section 100d stores therein a computing expression for performing the d-q coordinate transformation on the basis of detection current signals Iu, Iv detected by current sensors 102a, 102b and a current detection circuit 105, and of the electrical angle signal θ. Further, the section 100d carries out the d-q coordinate transformation on the basis of the detection current signals Iu, Iv and the electrical angle signal θ and feeds d- and q-axis detection current values to d-q axis voltage command section 100e after the transformation.

The d-q axis voltage command section 100e computes deviation in current between the d- and q-axis current command values Id*, Iq* and the d- and q-axis detection current values Id, Iq after the transformation. Further, by adding the signals, to which a proportional control and an integral control are respectively applied, to the computed deviation value, the section 100e determines a d-q axis voltage command values Vd*, Vq* and feeds them to the d-q coordinate inverse transformation section 100f The d-q coordinate inverse transformation section 100f stores therein a computing expression to perform the d-q coordinate inverse transformation on the basis of the d-q axis voltage command values Vd*, Vq* and the electrical angle signal θ. Further, the section 100f carries out the d-q coordinate inverse transformation on the basis of the d-q axis voltage command values Vd*, Vq* and the electrical angle signal θ, thereby generating the three-phase voltage command values vu*, vv*, Vw*.

The three-phase voltage command compensation section 100g, as shown in the following expressions (1) to (4), obtains a value serving as a predetermined voltage value Vref by averaging a maximum and a minimum among the three-phase voltage command values Vu*, Vv*, Vw*. Further, the section 100g carries out compensation by subtracting the predetermined voltage value Vref from the three-phase voltage command values Vu*, Vv*, Vw*, thereby calculating the three-phase voltage command compensation values vu, Vv, Vw**, and then feeds them to the PWM output section 100h.

$$Vref=\{max\ (Vu^*,\ Vv^*,\ Vw^*)$$
$$+min\ (Vu^*,\ Vv^*,\ VW^*)\}/2 \quad (1)$$
$$Vu^{**}=Vu^*-Vref \quad (2)$$
$$Vv^{**}=Vv^*-Vref \quad (3)$$
$$Vw^{**}=Vw^*-Vref \quad (4)$$

The PWM output section 100h generates PWM waveforms for PWM drive of the brushless motor 5 in response to the three-phase voltage command compensation values Vu, Vv, Vw** and feeds them to an electric motor drive circuit 101.

Figure 3:
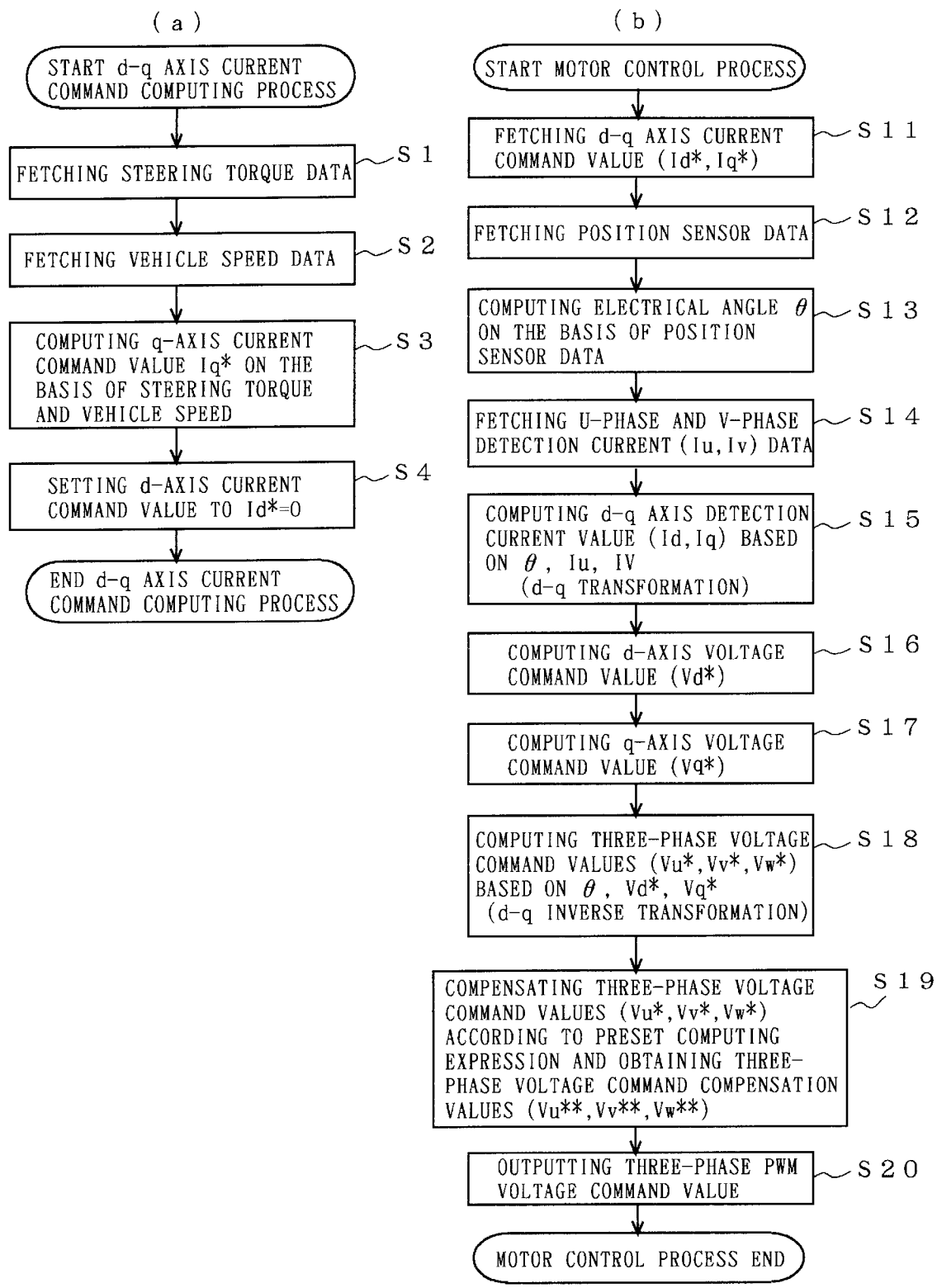
FIG. 3 is a flow chart for explaining an operation of an essential part according to the first embodiment of the invention.

FIG. 3 is a flow chart to explain an operation of the control computer 100, and in which (a) shows a flow of computing process of the d-q axis current command, and (b) shows a flow of motor control process.

Both of the d-q axis current command computing process and the motor control process are performed as an interruption operation with a regular cycle, however, the motor control process is performed with a cycle that is about 1/10 times as small as the interruption cycle of the d-q axis current command computing process.

In the flow of the d-q axis current-command computing process of FIG. 3 (a), when a start command of the d-q axis current command computing process is issued, first in step S1, steering torque data detected by the torque sensor 3 are fetched in. Then in step S2, vehicle-speed data detected by the vehicle speed sensor 6 are fetched in.

Next in step S3, on the basis of the steering torque and the vehicle speed having been fetched in, a q-axis current command value Iq* is computed. Finally in step S4, the d-axis current command value Id* is set to zero, thus ending the d-q axis current command computing process.

In the flow of the motor control process of FIG. 3 (b), when a start command of the motor control processing is issued, first in step S11, the d-and q-axis current command values Id*, Iq* having been obtained at the d-q axis current command computing process are fetched in.

Next, in step S12, position sensor data are fetched in from the position sensor 103. In step S13, an electrical angle θ is computed on the basis of the position sensor data. In step S14, data of U-phase and V-phase detection currents Iu, Iv from the current sensors 102a, 102b are fetched in. In step S15, the d-q coordinate transformation is performed on the basis of the electrical angle θ and the U-phase and V-phase detection currents Iu, Iv, thereby obtaining the d- and q-axis detection current values Id, Iq.

Further, in steps S16 and S17, deviations in current between the d- and q-axis current command values Id*, Iq* and the d- and q-axis detection current values Id, Iq after transformation are computed. Then, by adding the signals, to which proportional and integral controls have been applied, respectively to the computed deviations, the d- and q-axis voltage command values are computed respectively.

Subsequently, in step S18, on the basis of the electrical angle θ and the d- and q-axis voltage command values Vd*, Vq*, the d-q coordinate inverse transformation is performed thereby obtaining the three-phase voltage command values Vu*, Vv*, VW*. In step S19, these three-phase voltage command values Vu*, Vv*, Vw* are subject to compensation according to the previously set computing expressions, that is, the above-described expressions (1) to (4), thereby obtaining the three-phase voltage command compensation values Vu, Vv, Vw**.

Finally in step S20, these values are outputted to the PMW drive section 10 as the three-phase PWM voltage commands, thus ending the motor control process.

This motor control process can be performed in such a manner that, if the interruption cycle of the d-q axis current command processing is, for example, 1 ms, the interruption cycle for the motor control process can be approximately 1/10 times as small as that of the d-q axis current command process, that is, about 100 μs. Therefore, the torque control of the motor is performed precisely so that variation in torque or generation of torque ripple may be reduced.

Figure 4:
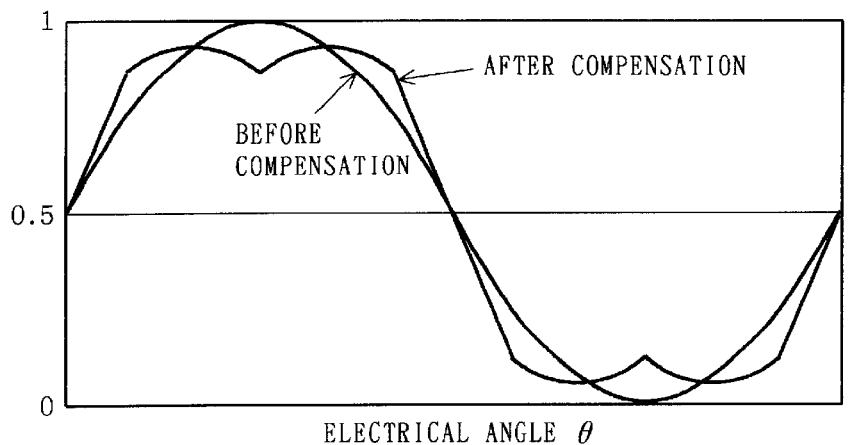
FIG. 4 is a diagram showing one example of a waveform according to the first embodiment of the invention, and in which efficiency of utilizing voltage is improved.

In the electric power steering control system arranged as described above, by means of the three-phase voltage command compensation section 100g, the voltage applied to the electric motor is compensated as shown in FIG. 4.

FIG. 4 shows a waveform of the voltage applied to one phase before and after compensation. In the case of three-phase motor, voltages applied to each phase are phase-shifted from each other by 120 degrees. Further, in the case of considering the voltage applied on the lines, waveform of the applied line voltage depicts the same sine wave voltage before and after compensation.

Figure 5:
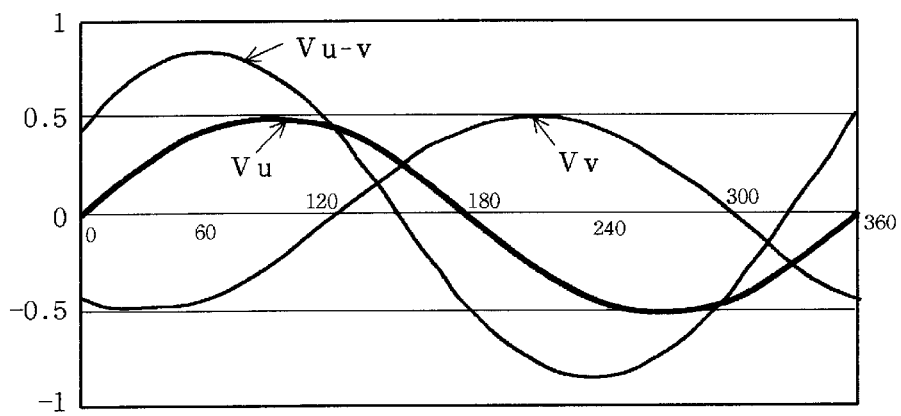
FIG. 5 is a view showing one example of a voltage waveform before compensation according to the first embodiment of the invention.
Figure 6:
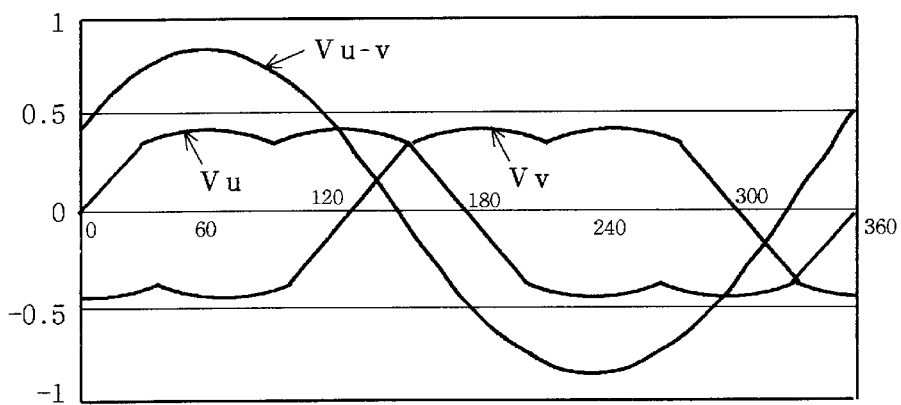
FIG. 6 is a view showing one example of the voltage waveform after compensation according to the first embodiment of the invention.

For example, FIG. 5 shows waveforms of the voltage applied to the U-phase and V-phase and a waveform of the line voltage applied to the U-V phase before compensation. Further, FIG. 6 shows waveforms of the voltage applied to the U-phase and V-phase and a waveform of the line voltage applied to the U-V phase after compensation.

Amplitude of the waveforms of the voltage applied to the U-phase and V-phase after compensation is smaller than that of the waveforms of the voltage applied to the U-phase and V-phase before compensation. However, before and after compensation, waveform of the line voltage applied to the U-V phase is the same.

That is, when performing the compensation, amplitude of the voltage applied to each phase necessary for obtaining the same applied line voltage as without compensation can be smaller.

Figure 7:
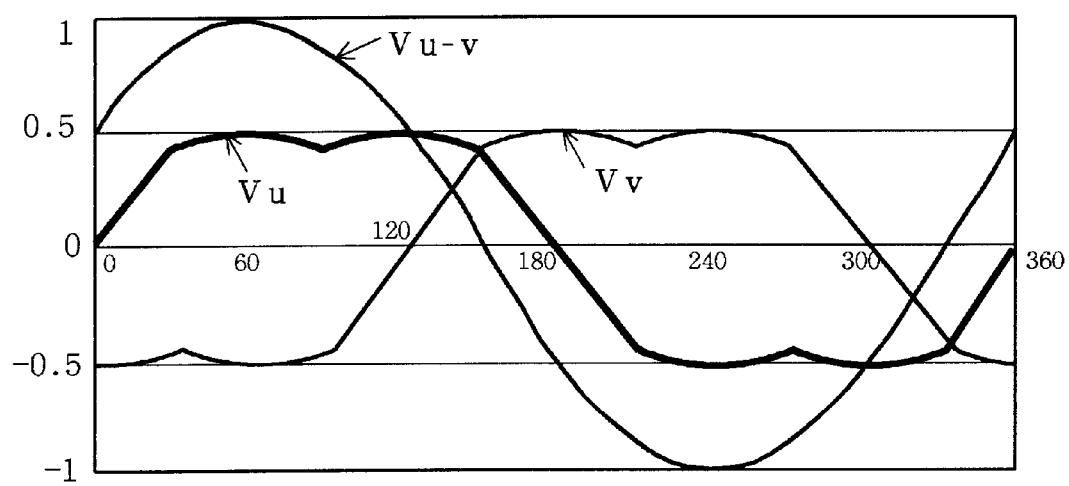
FIG. 7 is a diagram showing another example of the voltage waveform after compensation according to the first embodiment of the invention.

FIG. 7 shows an example of amplitude of the voltage applied to each phase after compensation that is the same as before. As compared with FIG. 5, the voltage applied on the lines becomes $2/\sqrt{3}$ times as large, thus efficiency of utilizing voltage is improved by approximately 15%.

In addition, in the case of the three-phase current detection Iu, Iv, Iw, the d-q coordinate transformation is computed on the following mathematic expression 9:

$$\begin{bmatrix} Id \\ Iq \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Iu \\ Iv \\ Iw \end{bmatrix}$$

Further, in the case of the two-phase current detection Iu, Iv, the d-q coordinate transformation is computed on the following mathematic expression 10 or 11:

$$Iw = -Iu - Iv$$

$$\begin{bmatrix} Id \\ Iq \end{bmatrix} = \sqrt{2} \begin{bmatrix} \sin\left(\theta + \frac{\pi}{3}\right) & \sin\theta \\ \cos\left(\theta + \frac{\pi}{3}\right) & \cos\theta \end{bmatrix} \begin{bmatrix} Iu \\ Iv \end{bmatrix} \text{ or }$$

$$\sin\left(\frac{\pi}{2} \pm \theta\right) = \cos\theta$$

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

Among the above expressions 9, 10, 11, the expressions 9, 10 require both sine table and cosine table. However, the expression 11 requires only the sin table, thus load for computation is advantageously small.

In addition, the d-q coordinate inverse transformation is computed on the following mathematic expression 12 or 13.

$$\begin{bmatrix} Vu^* \\ Vv^* \\ Vw^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Vd^* \\ Vq^* \end{bmatrix}$$

$$= \sqrt{\frac{2}{3}} \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} Vd^* \\ Vq^* \end{bmatrix} \text{ or }$$

$$\sin\left(\frac{\pi}{2} \pm \theta\right) = \cos\theta$$

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$VW^* = -Vu^* - Vv^*$$

Likewise in this case, the expression 12 requires both sine table and cosine table, while the expression 13 requires only the sine table, which is an advantage of small load for computation.

Embodiment 2.

The electric power steering control system according to the second preferred embodiment of the invention is hereinafter described referring to the drawings.

Figure 8:
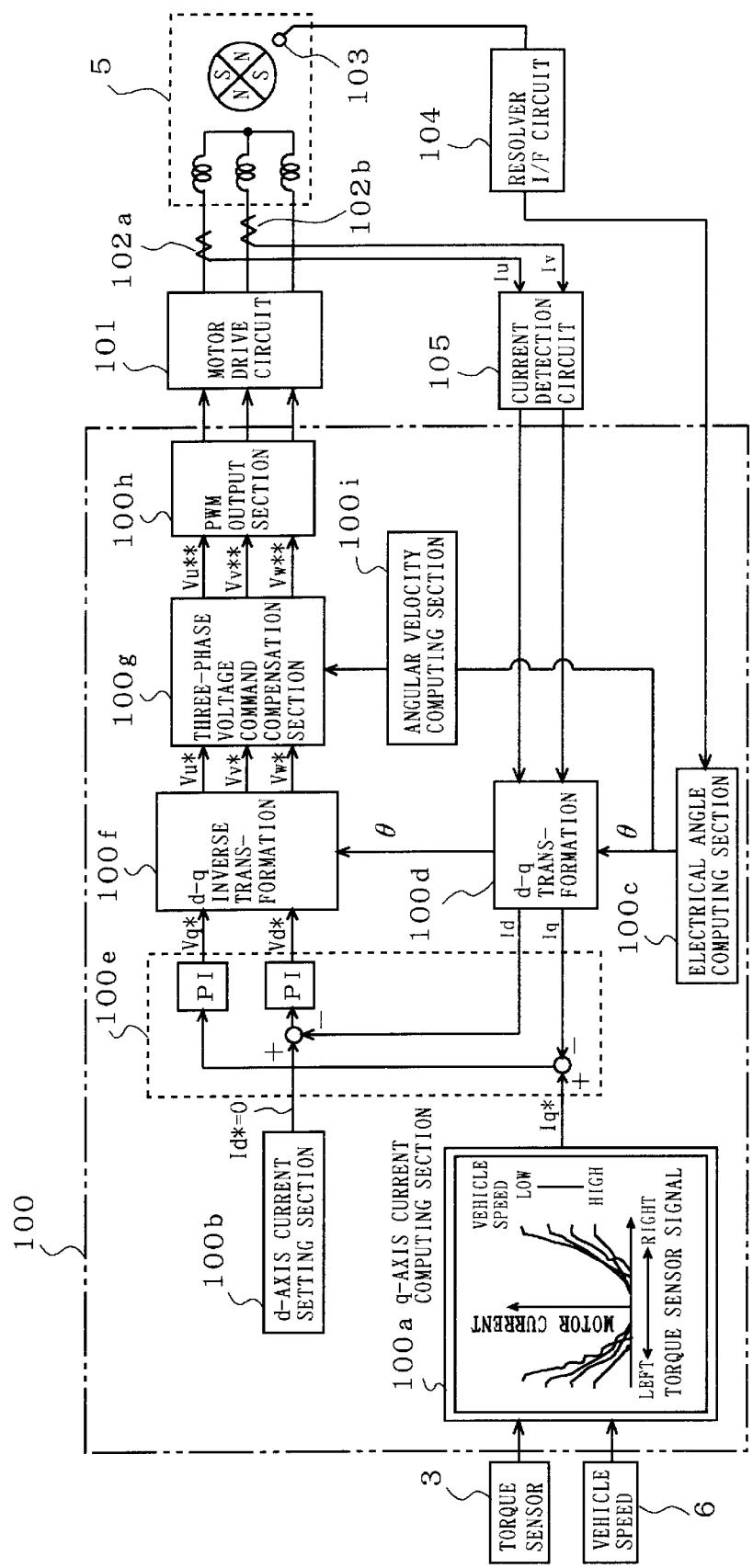
FIG. 8 is a block diagram showing an operation of a second embodiment according to the invention.

FIG. 8 is a block diagram showing an operation of the electric power steering control system according to the second embodiment.

This second embodiment is arranged as follows. An angular velocity computing section 100$i$ is added to the foregoing first embodiment of the invention, and in which an angular velocity is computed from the electrical angle signal θ. Only in the case of the revolution number of the motor being not less than a predetermined value, for example, 2400 (rpm). The three-phase voltage command compensation section 100$g$ uses a minimum value among the three-phase voltage command values Vu*, vV*, Vw* as a predetermined voltage value Vref, and subtracts the predetermined voltage value Vref from the three-phase voltage command values Vu*, Vv*, Vw*, thereby performing a compensation, as shown in the following expressions (5) to (8). In this manner, the section 100$g$ calculates the three-phase voltage command compensation values Vu, Vv, Vw** and feeds them to the PWM output section 100$h$.

$$Vref = \min(Vu^*, Vv^*, VW^*) \quad (5)$$

$$Vu^{**} = Vu^* - Vref \quad (6)$$

$$Vv^{**} = Vv^* - Vref \quad (7)$$

$$Vw^{**} = Vw^* - Vref \quad (8)$$

Figure 9:
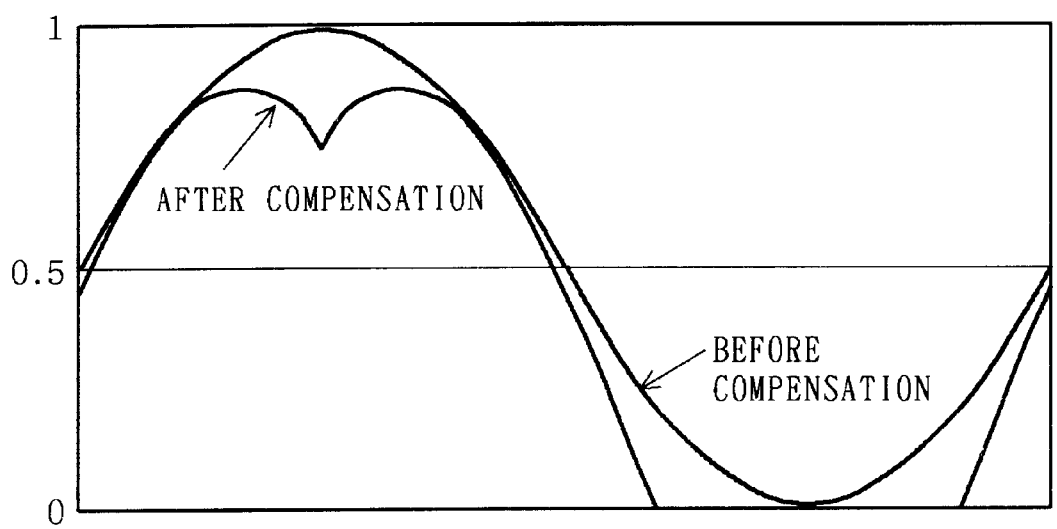
FIG. 9 is a diagram showing one example of the waveform according to the second embodiment of the invention, and in which efficiency of utilizing the voltage is improved.

In the electric power steering control system arranged as described above, since the voltage applied to the brushless motor 5 is compensated as shown in FIG. 9 by the three-phase voltage command compensation section 100$g$, the same advantage as the foregoing first embodiment can be obtained. Thus, efficiency of utilizing voltage is improved.

In particular, by using a minimum value among the voltage command values of the individual phases as the predetermined voltage value Vref, not only efficiency of utilizing voltage can be improved, but also switching of any phase is turned off at all times, a switching loss of any element can be reduced.

In general, there is a possibility that when modulation rate is low, a current ripple increases, which affects negatively. However, this second embodiment is arranged such that, only in the case of the revolution number of the motor being not less than a predetermined value, the three-phase voltage command values are compensated thereby improving the efficiency of utilizing voltage. As a result, the command values are not compensated when modulation rate is low, whereby increase in the current ripple can be restrained.

Embodiment 3.

Figure 10:
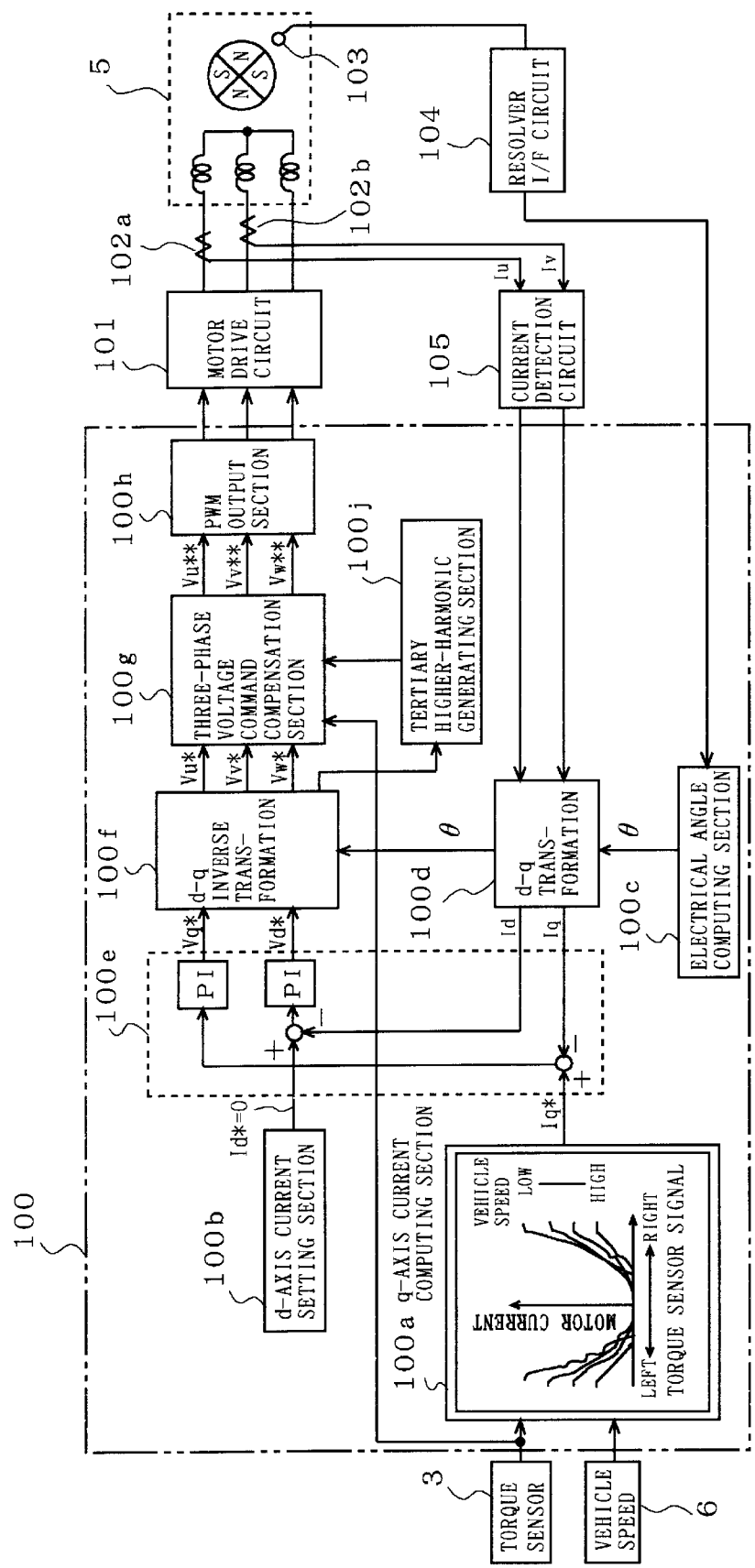
FIG. 10 is a block diagram showing an operation of a third embodiment according to the invention.

FIG. 10 is a block diagram showing an operation of the electric power steering control system according to the third preferred embodiment of the invention.

The third embodiment is arranged as follows. The first embodiment of the invention further comprises a tertiary higher-harmonic generating section 100$j$ of the three-phase voltage command values Vu*, Vv*, Vw*. This tertiary higher-harmonic generating section 100$j$ feeds a steering torque to the three-phase voltage command compensation section 100$g$. And only in the case that the steering torque is not less than a predetermined value, for example, 2.0 (Nm), the section 100$j$ superposes the tertiary higher harmonic thereof on the three-phase voltage command values using the three-phase voltage command values as fundamental sine waves. In this manner, the three-phase voltage command compensation values Vu, Vv, Vw** are generated and fed to the PWM output section 100$h$.

Figure 11:
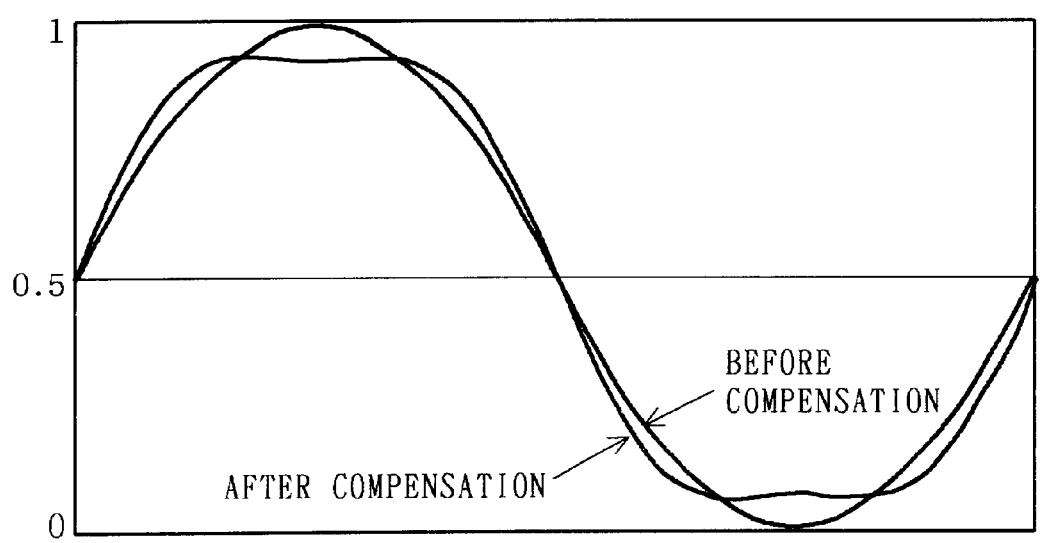
FIG. 11 is a view showing one example of the waveform according to the third embodiment of the invention, and in which efficiency of utilizing the voltage is improved.

In the electric power steering control system arranged as described above, only in the case that the steering torque is not less than a predetermined value, the voltage applied to the brushless motor 5 is compensated by means of the three-phase voltage command compensation section 100$g$, as shown in FIG. 11. Therefore, a normal load for computation is small. In the case that a motor torque is decreased (the steering torque is increased) due to the voltage saturation, the same advantage as in the foregoing first embodiment can be obtained. As a result, efficiency of utilizing voltage is improved.

What is claimed is:

1. An electric power steering control system arranged to control a drive current of a brushless motor that generates a steering assist force on the basis of a steering torque acting on a steering shaft and a vehicle speed, comprising:
    a d-q-axis current command section for computing a d- and q-axis current command value for generating a steering assist force in response to a predetermined characteristic on the basis of said steering torque and said vehicle speed;
    an electrical angle computing section for computing an electrical angle signal on the basis of a rotational position signal of said brushless motor;
    a d-q coordinate transformation section for performing a d-q coordinate transformation on the basis of a detection current signal in response to a three-phase AC current to be inputted to said brushless motor and of said electrical angle signal, thereby obtaining a d- and q-axis detection current value;
    a d-q axis voltage command section for computing a d- and q-axis voltage command value in response to a deviation between said d- and q-axis current command value and said d- and q-axis detection current value;
    a d-q coordinate inverse transformation section for performing a d-q coordinate inverse transformation on the basis of said d- and q-axis voltage command value and said electrical angle signal thereby computing a three-phase voltage command value;
    a three-phase voltage command compensation section for performing compensation with respect to said three-phase voltage command value according to a computing expression for improving efficiency of utilizing a previously set voltage, thereby computing a three-phase voltage command compensation value; and
    a PWM output section for generating a PWM waveform for PWM drive of said brushless motor in response to said three-phase voltage command compensation value.

2. The electric power steering control system according to claim 1, wherein in said three-phase voltage command compensation section, a three-phase voltage command compensation value is obtained by subtracting a predetermined voltage value from said three-phase voltage command value.

3. The electric power steering control system according to claim 2, wherein a value obtained by averaging a maximum value and a minimum value among said three-phase voltage command values is used as said predetermined voltage value.

4. The electric power steering control system according to claim 2, wherein a minimum value of said three-phase voltage command values is used as said predetermined voltage value.

5. The electric power steering control system according to claim 4, wherein compensation is performed with respect to said three-phase voltage command value in said three-phase voltage command compensation section, only when revolution of said brushless motor is not less than a predetermined value.

6. The electric power steering control system according to claim 1, wherein in said three-phase voltage command compensation section, a tertiary higher-harmonic of said three-phase voltage command value is superposed on said three-phase voltage command value as a fundamental sine wave, thereby obtaining a three-phase voltage command compensation value.

7. The electric power steering control system according to claim 6, wherein compensation is performed with respect to said three-phase voltage command value in said three-phase voltage command compensation section, only when said steering torque is not less than a predetermined value.

8. The electric power steering control system according to claim 1, wherein in said d-q coordinate transformation section, a following mathematical expression is used as a computing expression to perform the d-q coordinate transformation:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Id and Iq are d- and q-axis detection current values; Iu and Iv are U-phase and V-phase detection current values to be inputted to the brushless motor; and θ is an electrical angle responsive to a rotational position of the brushless motor.

9. The electric power steering control system according to claim 1, wherein in said d-q coordinate inverse-transformation section, a following mathematic expression is used as a computing expression to perform the d-q coordinate inverse transformation:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel responsive to the rotational position of the brushless motor.

10. An electric power steering control method arranged to control a drive current of a brushless motor that generates a steering assist force on the basis of a steering torque acting on a steering shaft and a vehicle speed, comprising:
    a first step of computing a d- and q-axis current command value for generating a steering assist force in accordance with a predetermined characteristic on the basis of said steering torque and said vehicle speed;
    a second step of performing a d-q coordinate transformation on the basis of a detection current signal in response to a three-phase AC current to be inputted to said brushless motor and an electrical angle signal in response to a rotational position of said brushless motor thereby obtaining a d- and q-axis detection current value;
    a third step of computing a d- and q- axis voltage command value in response to a deviation between said d- and q-axis current command value and said d- and q-axis detection current value;
    a fourth step of performing a d-q coordinate inverse transformation on the basis of said d- and q-axis voltage command value and said electrical angle signal, thereby computing a three-phase voltage command value;

a fifth step of performing compensation with respect to said three-phase voltage command value in accordance with a computing expression for improving efficiency of utilizing a previously set voltage, thereby generating a three-phase voltage command compensation value; and a sixth step of generating a PWM waveform for PWM drive of said brushless motor in response to said three-phase voltage command compensation value.

11. The electric power steering control method according to claim 10, wherein in said fifth step, a three-phase voltage command compensation value is obtained by subtracting a predetermined voltage value from said three-phase voltage command value.

12. The electric power value steering control method according to claim 11, wherein a value obtained by averaging a maximum value and a minimum value among said three-phase voltage command values is used as said predetermined voltage value.

13. The electric power steering control method according to claim 11, wherein a minimum value of said three-phase voltage command values is used as said predetermined voltage value.

14. The electric power steering control method according to claim 13, wherein compensation is performed with respect to said three-phase voltage command in said three-phase voltage command compensation section, only when revolution of said brushless motor is not less than a predetermined value.

15. The electric power steering control method according to claim 10, wherein in said fifth step, a tertiary higher-harmonic of said three-phase voltage command value is superposed on said three-phase voltage command value as a fundamental sine wave, thereby obtaining a three-phase voltage command compensation value.

16. The electric power steering control method according to claim 15, wherein compensation is performed with respect to said three-phase voltage command value in said fifth step, only when said steering torque is not less than a predetermined value.

17. The electric power steering control method according to claim 10, wherein in said second step, a following mathematical expression is used as a computing expression to perform the d-q coordinate transformation:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Id and Iq are d- and q-axis detection current values; Iu and Iv are U-phase and V-phase detection current values to be inputted to the brushless motor; and $\theta$ is an electrical angle responsive to a rotational position of the brushless motor.

18. The electric power steering control method according to claim 10, wherein in said fourth step, a following mathematic expression is used as a computing expression to perform the d-q coordinate inverse transformation:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv$$

where: Vu*, Vv* and Vw* are U-phase, V-phase and W-phase voltage command values; Vd* and Vq* are d- and q-axis voltage command values; and $\theta$ is an electrical angel responsive to the rotational position of the brushless motor.

* * * * *